(12) United States Patent
Arnault

(10) Patent No.: US 7,222,709 B2
(45) Date of Patent: May 29, 2007

(54) CLUTCH RELEASE BEARING

(75) Inventor: Benoit Arnault, Saint Cyr sur Loire (FR)

(73) Assignee: Aktiebolaget SKF, Göteborg (SE)

( * ) Notice: Subject to any disclaimer, the term of this patent is extended or adjusted under 35 U.S.C. 154(b) by 72 days.

(21) Appl. No.: 10/870,483

(22) Filed: Jun. 17, 2004

(65) Prior Publication Data

US 2005/0011717 A1    Jan. 20, 2005

(30) Foreign Application Priority Data

Jun. 18, 2003   (FR) ................... 03 07356

(51) Int. Cl.
*F16D 23/14*   (2006.01)
(52) U.S. Cl. .................. 192/98; 192/110 B
(58) Field of Classification Search ........... 192/98, 192/110 B
See application file for complete search history.

(56) References Cited

U.S. PATENT DOCUMENTS

| | | | |
|---|---|---|---|
| 4,874,073 A | 10/1989 | Tagawa | |
| 5,865,288 A * | 2/1999 | Thomire et al. | ........ 192/85 CA |
| 6,056,446 A | 5/2000 | Welter et al. | |
| 6,415,900 B1 * | 7/2002 | Lopez et al. | ............ 192/85 CA |
| 6,612,749 B2 | 9/2003 | Arnault et al. | |
| 2004/0154895 A1 | 8/2004 | Thomire et al. | |

FOREIGN PATENT DOCUMENTS

| | | |
|---|---|---|
| DE | 10148388 | 4/2003 |
| EP | 0399855 | 11/1990 |
| EP | 1 146 244 | 10/2001 |
| EP | 1146244 | 10/2001 |
| FR | 2577291 | 8/1986 |
| FR | 2611244 | 8/1988 |
| FR | 2772444 | 6/1999 |
| FR | 2819864 | 7/2002 |
| GB | 1580301 | 12/1980 |
| GB | 2054084 | 2/1981 |
| JP | 6213251 | 8/1994 |
| WO | 02052163 | 7/2002 |

OTHER PUBLICATIONS

Preliminary Search Report for FR 0307356 mailed on Nov. 23, 2003 (2 pages).
Preliminary Search Report for FR 0307355 mailed on Nov. 24, 2003 (2 pages).

(Continued)

*Primary Examiner*—Saul Rodriguez
(74) *Attorney, Agent, or Firm*—Meyertons, Hood, Kivlin, Kowert & Goetzel, P.C.; Eric B. Meyertons

(57) ABSTRACT

A clutch release bearing device including an operating element, a rolling bearing equipped with a non-rotating race and a rotating race secured axially to the operating element, and an annular fixing ring provided with an axial portion mounted in the operating element and with an axially elastic portion bearing axially against the non-rotating race on the axially opposite side to the operating element, the fixing ring being able to hold the non-rotating race axially secured to the operating element while at the same time allowing radial movement.

19 Claims, 4 Drawing Sheets

OTHER PUBLICATIONS

Preliminary Search Report for FR 0311989 mailed on Feb. 24, 2004 (2 pages).

U.S. Appl. No. 10/870,484 entitled "Clutch Release Bearing and Method of Assembly" filed on Jun. 17, 2004 (21 pages, including cover sheet and drawings).

U.S. Appl. No. 10/965,679 entitled "Clutch Release Bearing Device" filed on Oct. 14, 2004 (19 pages including cover sheet and drawings).

* cited by examiner

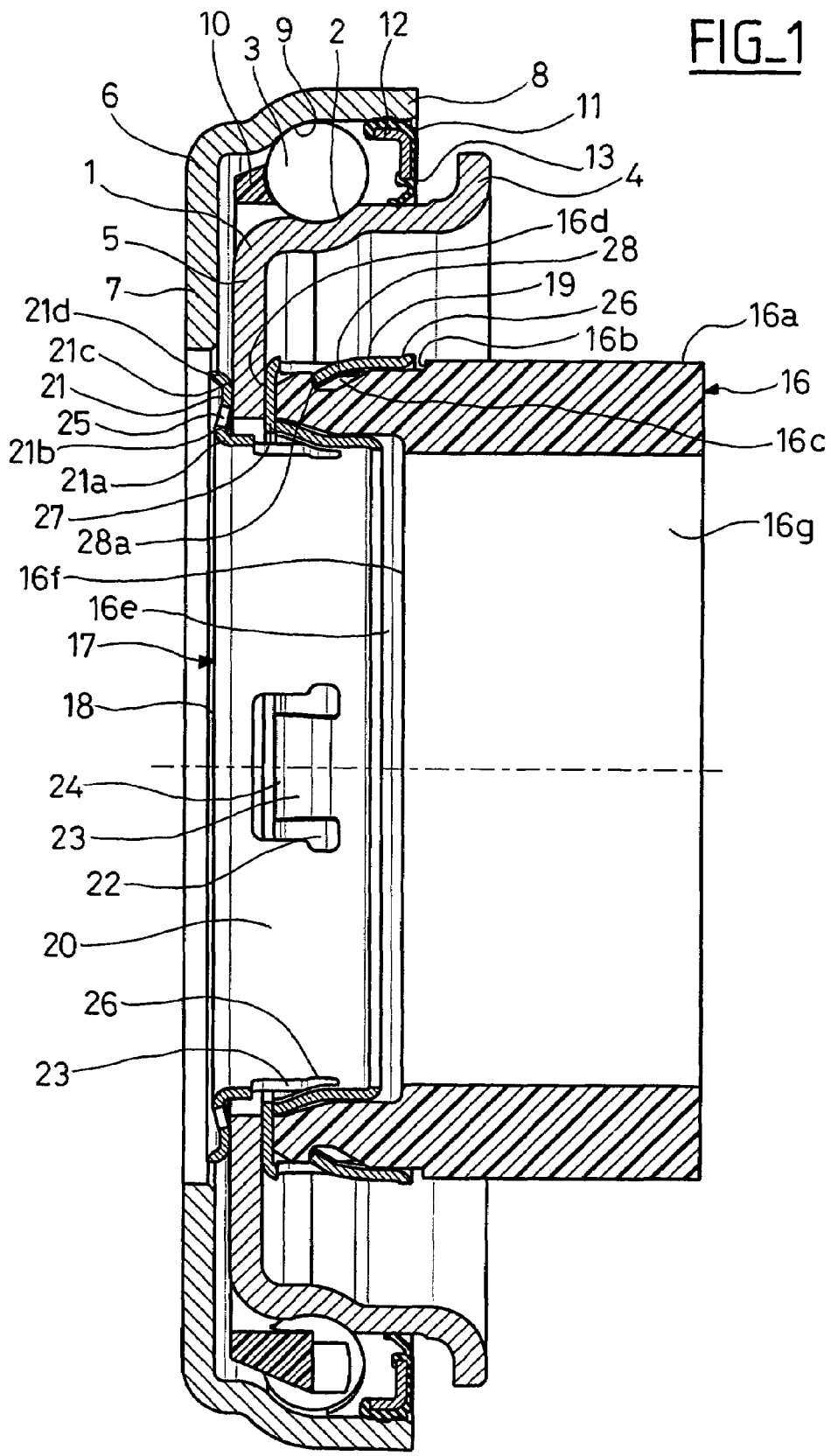
FIG_1

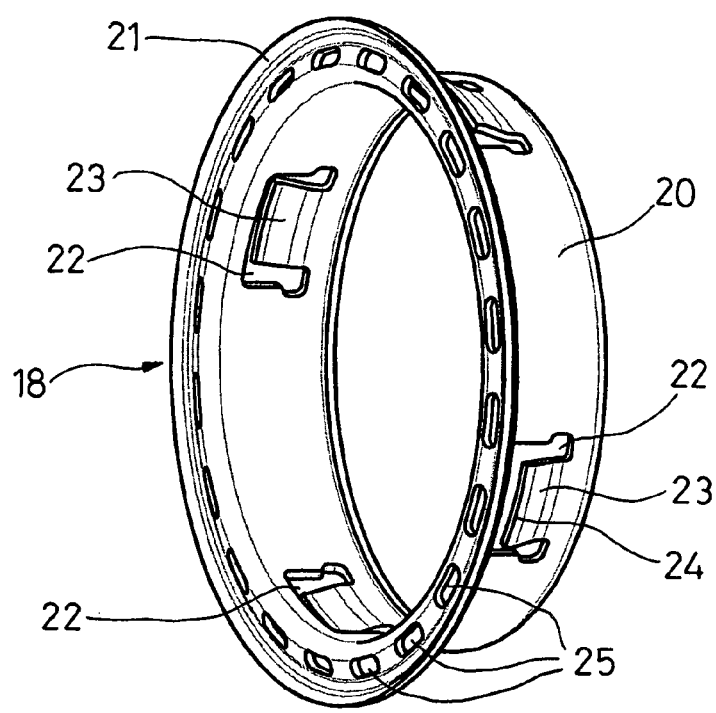
FIG_2
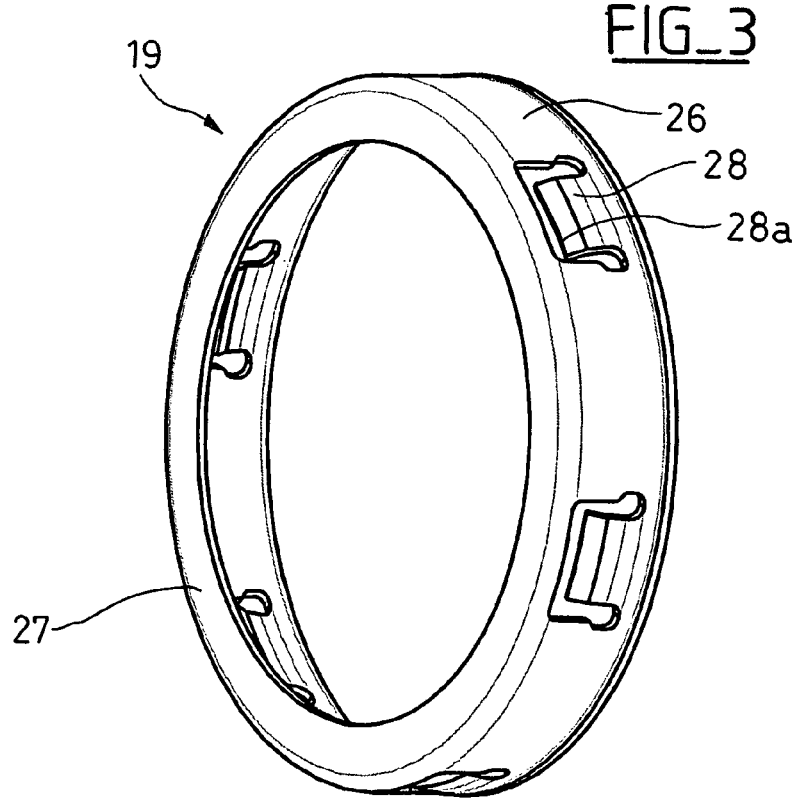
FIG_3

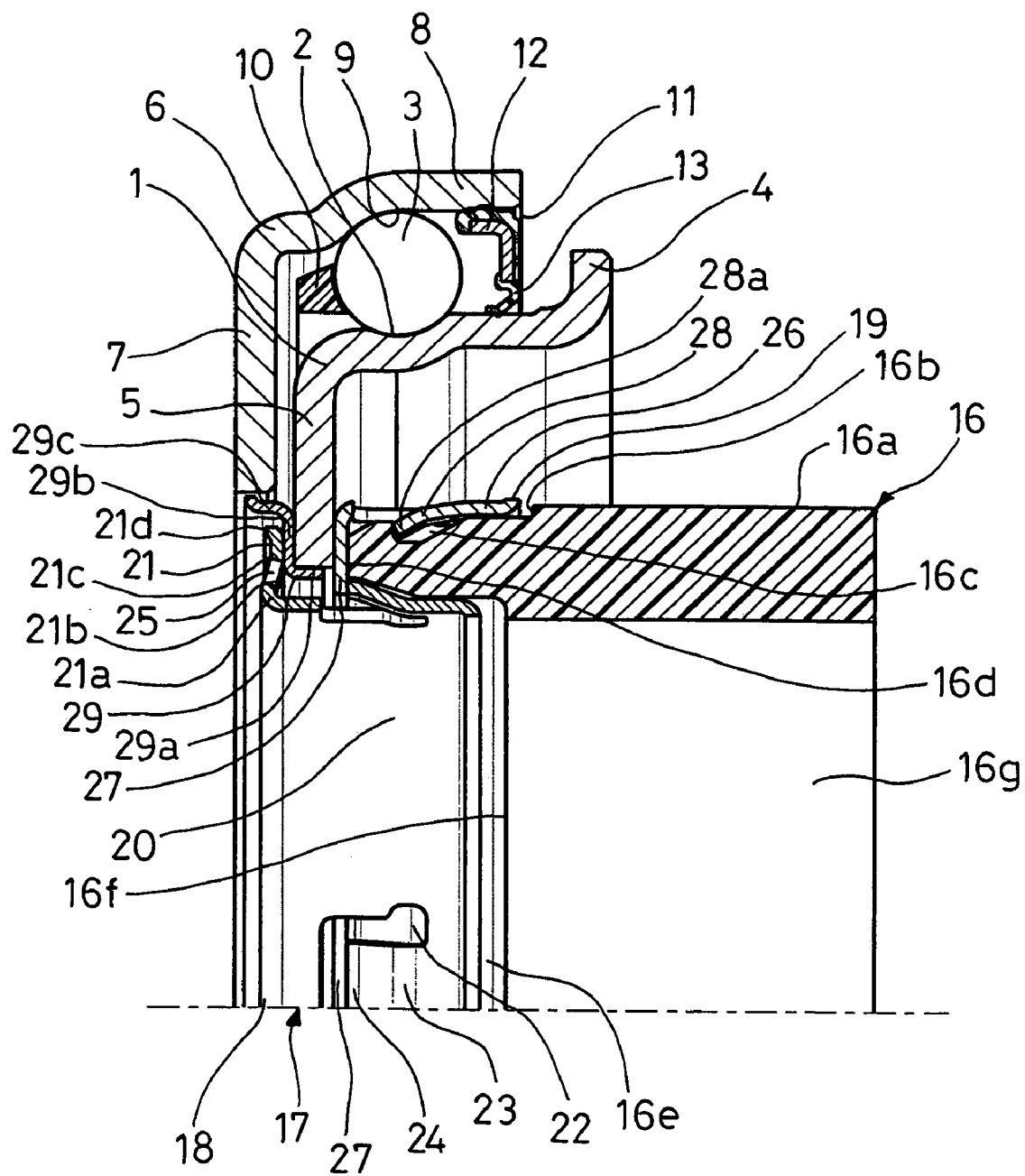
FIG_4

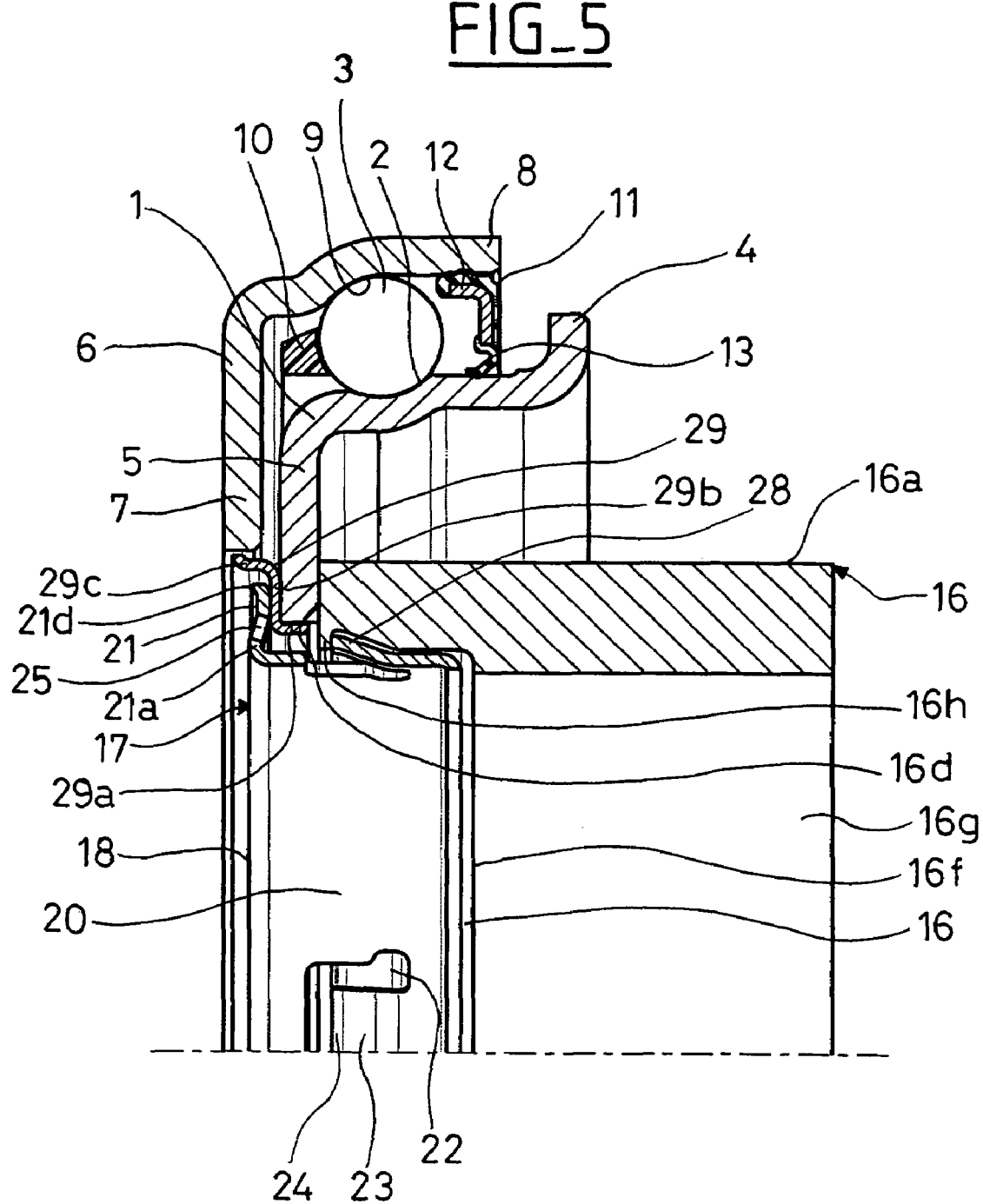

CLUTCH RELEASE BEARING

BACKGROUND OF THE INVENTION

1. Field of the Invention

The present invention relates to the field of clutch release bearings intended to act on the diaphragm of a clutch, particularly for a motor vehicle.

2. Description of the Relevant Art

Clutch release bearings often include a rolling bearing, one of the races of which rotates and the other race of which does not rotate. Between the rotating race and the non-rotating race there are balls uniformly distributed in the circumferential direction by means of a cage, the rotating race being equipped with a substantially radial attacking surface intended to come into contact with the end of the fingers that make up the diaphragm of the clutch. An operating element supports the rolling bearing and, under the action of a control member (that may be mechanical, electrical or hydraulic) axially moves the thrust rolling bearing against the diaphragm of the clutch.

Document WO 02/052163 describes a clutch release bearing for a motor vehicle, the bearing being equipped with a piston able to move axially and a ring caught on the piston using elastic gripping means that have an axial effect. One face of the ring bears against a catching face formed in the piston. The gripping means bear against the opposite face of the ring and another catching face also formed in the piston. The elastic gripping means are in the form of an annular attachment provided with lugs projecting into axial drillings made in the piston which open into radial drillings. The shape of the piston is therefore relatively complicated and this is detrimental in terms of cost. Furthermore, the piston, the attachment, the elastic washer associated with it and the ring need to be fitted simultaneously, and this makes the assembly process more complicated.

The present invention sets out to overcome these disadvantages.

SUMMARY

Described herein is a particularly robust and reliable clutch release bearing with elements of relatively simple shape.

In an embodiment, a clutch release bearing device includes an operating element and a rolling bearing equipped with a non-rotating race and with a rotating race, the rolling bearing being axially secured to the operating element. The device includes an annular fixing ring provided with an axial annular portion mounted in the operating element and with an axially elastic portion bearing axially against the non-rotating race on the axially opposite side to the operating element, the annular ring being able to hold the non-rotating race axially secured to the operating element while at the same time allowing radial movement. A device may act on a diaphragm of a clutch mechanism.

The mounting of the thrust bearing is easy and practical. The elastic fixing ring can be mounted after the rolling bearing has been assembled, clipping on through an axial movement. The operating element has a simple shape and is therefore robust. In an embodiment, the fixing ring may advantageously be of one piece. The fixing ring is therefore robust and economical.

In one embodiment, the fixing ring is in direct contact with the operating element.

In one embodiment, the axial portion of the fixing ring is mounted in a bore of the operating element. This then avoids increasing the bulk.

In one embodiment, the elastic portion is substantially radial and is inclined towards the radial portion of the non-rotating race. The elastic portion may have a convex surface on the same side as the non-rotating race. The convex surface may rub against the non-rotating race during axial movement, without excessive wear.

In one embodiment, a plurality of holes are made in the elastic portion. This then increases the axial flexibility of the elastic portion. The elastic portion may include a plurality of axially elastic tabs.

In one embodiment, the axial portion of the fixing ring includes fixing tabs for fixing to the operating element. The fixing ring may be fixed to the operating element by a simple axial movement, the fixing tabs having a certain degree of radial elasticity. In one embodiment, the free end of the fixing tabs is in contact with a surface secured to the operating element. In one embodiment, the free end of the fixing tabs is in contact with a substantially radial surface of the operating element. The substantially radial surface may be formed of an annular rib formed in the bore of the operating element.

The fixing ring may include an axial portion mounted in the operating element and supporting elastic tabs, and an axially elastic portion for holding the non-rotating race.

In one embodiment, the device includes an additional fixing ring secured to the operating element. In one embodiment, the additional fixing ring includes an axial portion and a radial portion in contact with the operating element. In another embodiment, the radial portion of the additional fixing ring is in contact with the non-rotating race. This then prevents contact between the operating element and the non-rotating race.

In one embodiment, the additional fixing ring includes fixing tabs for fixing to the operating element, the tabs originating from the axial portion.

In one embodiment, the axial portion of the additional fixing ring surrounds a part of the operating element.

In one embodiment, the additional fixing ring includes a retaining surface for retaining the fixing ring.

The additional fixing ring may include an annular cup of L-section with an axial portion mounted around the operating element and supporting elastic tabs, and a radial portion for contact with the non-rotating race and for retaining the fixing ring. Retention of the fixing ring may be through contact between the free end of the tabs of the fixing ring and a surface of the radial portion near its small-diameter end.

In one embodiment, the non-rotating race includes an inwardly facing radial portion arranged axially between the elastic portion of the fixing ring and a surface secured to the operating element. The surface secured to the operating element may be a surface of the additional ring or a surface of the operating element itself. The non-rotating race may have a minimum diameter slightly larger, for example by a few tenths of a millimetre or by a few millimetres, than the outside diameter of the second axial portion. The axial portion of the fixing ring may pass through the smaller-diameter region of the non-rotating race.

In one embodiment, the non-rotating race is in direct contact with the elastic portion of the fixing ring.

In one embodiment, the device includes a sealing element secured to the non-rotating race and in contact with the elastic portion of the fixing ring. The sealing element may form a narrow passage with the rotating race.

In one embodiment, the operating element is a hydraulic pusher.

In an embodiment, a clutch control system may include a clutch release bearing device having an operating element, a rolling bearing having a non-rotating race and a rotating race in contact with a diaphragm, the rolling bearing being secured axially to the operating element. The device may include an annular fixing ring provided with an axial annular portion mounted in the operating element and with an axially elastic portion bearing against the non-rotating race on the axially opposite side to the operating element, the annular ring being able to hold the non-rotating race axially secured to the operating element while at the same time allowing radial movement.

The fixing ring is economical to manufacture, easy to fit in a simple axial movement, and takes up very little space.

BRIEF DESCRIPTION OF THE DRAWINGS

The present invention will be better understood from studying the detailed description of a few embodiments which are taken by way of nonlimiting examples and illustrated by the attached drawings, in which:

FIG. 1 is a view in axial section of a clutch release bearing according to one aspect;

FIG. 2 is a perspective view of a fixing ring;

FIG. 3 is a perspective view of an additional fixing ring;

FIG. 4 is a half-view in axial section of a clutch release bearing according to another embodiment; and FIG. 5 is a half-view in axial section of a clutch release bearing according to another embodiment.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As can be seen in FIG. 1, the clutch release bearing includes a non-rotating bearing race 1 with a thin wall, made by pressing a metal sheet or from a tube having a circular raceway in the form of a portion of a torus 2 for a row of rolling elements, in this instance balls 3, the raceway having a central axial section that in profile is the shape of a concave circular arc. The inner race 1 includes a radial portion 4 facing outwards and a radial portion 5 facing inwards, the radial portions 4 and 5 being arranged one on each side of the rolling elements 3. The non-rotating race 1 is an inner race. As an alternative, the non-rotating race 1 may be an outer race.

The rolling bearing is supplemented by an outer race 6 exhibiting a radial portion 7 projecting towards the inside of the assembly and a cylindrical portion 8 on the same side as the radial portion 4. The radial portion 7 is capable of coming into contact with the surface of a diaphragm or of an equivalent element, not depicted, allowing operation of a clutch, particularly of a motor vehicle. The outer race 6 also includes a thin wall which may be produced by pressing a thick metal sheet or from a tube. The outer race 6 has a circular raceway 9, in the shape of a portion of a torus, for the row of rolling elements 3, the raceway having, in central axial section, a profile in the shape of a concave circular arc. The rolling elements 3 are held by a cage 10 between the raceway 2 of the inner race 1 and the raceway 9 of the outer race 6. The ball bearing is supplemented by a sealing member 11 mounted in a sealed manner in the cylindrical portion 8 of the outer race 5 and including an armature 12 and a flexible part 13 that rubs against a cylindrical bearing surface of the non-rotating race 1.

The clutch release bearing is supplemented by an operating element 16, visible in FIG. 1. The operating element 16 may be a part separate from the control member that actuates the device or may form an integral part thereof. The operating element 16 may for example include a hydraulic piston of a hydraulically operated clutch release device.

The clutch release bearing also includes a means 17 for axially securing the operating element 16 and the thrust rolling bearing, more specifically the non-rotating race 1. The axial securing means 17 may allow the non-rotating race 1 of the thrust rolling bearing a certain radial movement with respect to the operating element 16.

In an embodiment, the operating element 16 is in the form of a portion of a tube made of a synthetic material provided with a cylindrical bore and with an exterior surface 16a also cylindrical and surrounded at a certain distance by the spring. However, the end of the operating element 16, on the same side as the axial securing means 17, has an outside diameter that is slightly small with a shoulder 16b and an annular groove 16c. The annular groove 16c, which is open to the outside, may have a substantially radial rim on the opposite side to the shoulder 16b. A radial surface 16d forms the frontal end of the operating element 16 on the same side as the axial securing means 17. The bore of the operating element 16 is stepped and includes a large-diameter portion 16e on the same side as the axial securing means 17, a shoulder 16f, and a small-diameter portion 16g at the opposite end to the axial securing means 17.

As can be seen in FIGS. 2 and 3, the axial securing means 17 may include a fixing ring 18 and an additional ring 19 that are separate from one another.

The fixing ring 18 is in the form of a one-piece part made of sheet metal, generally annular with an L-section. The fixing ring 18 includes an axial annular portion 20 and an axially elastic portion 21. The axial portion 20 is arranged in the bore of the radial portion 5 of the non-rotating race 1 and in contact with the large-diameter portion 16e of the bore of the operating element 16, axially in the region of the rolling elements 3. The axial portion 20 projects beyond the radial portion 5 and is extended by the elastic portion 21. The difference in diameter between the axial portion 20 and the bore of the radial portion 5 allows the thrust rolling bearing a certain degree of radial movement with respect to the operating element 16 and thus allows the rolling bearing to self-align with the diaphragm of the clutch.

Formed by cutting in the axial portion 20 are a number of U-shaped apertures 22, leaving tabs 23 that exhibit a certain radial elasticity, attached to the axial portion 20 on its free-end side, near the shoulder 16f. The tabs 23 comprise a free end 24 bent obliquely slightly outwards. The free ends of the tabs 23 face towards the frontal part of the thrust bearing. The frontal part of the thrust bearing is to be understood as meaning the part intended to come into contact with the diaphragm.

The elastic portion 21 extends outwards from the axial portion 20 and has a maximum diameter greater than the bore of the radial portion 5 to interfere with the radial portion 5. The elastic portion 21 has a radial overall shape, slightly inclined towards the radial portion 5, with a concave region 21a on the same side as the radial portion 5 near the axial portion 20, followed by a frustoconical region 21b then a convex region 21c able to come into contact with the radial portion 5 with the possibility of relative radial sliding due to the self-alignment, and an outer rim 21d jutting out away from the radial portion 5. A plurality of apertures 25 is formed in the elastic portion 21 substantially at the frustoconical region. The apertures 25 increase the axial flexibility of the elastic portion 21.

Alternatively, the elastic portion may be cut into a plurality of tabs coming into contact with the radial portion 5. The tabs may originate from an interior edge and face outwards or may originate from an outer edge and face inwards.

The additional fixing ring 19 is in the form of a one-piece part made of pressed sheet metal, generally annular of L-section. The additional ring 19 includes an annular axial portion 26 and an annular radial portion 27 extending inwards from the axial portion 26, projecting beyond the large-diameter portion 16e of the bore of the operating element 16. The radial portion 27 serves as an abutment surface for the free ends 24 of the tabs 23 to axially hold the fixing ring 18. The radial portion 27 is in contact on one side with the radial frontal end surface of the operating element 16 and the free ends 24 of the tabs 23, and on the other side with the radial portion 5 of the non-rotating race 1.

The axial portion 26 is mounted around the small-diameter free end of the operating element 16. The free end of the axial portion 26 is situated a small distance away from the shoulder 16b. Formed in the axial portion 26 are a plurality of U-shaped cutouts, leaving the same number of tabs 28, the free end of which faces axially towards the radial portion 27 and radially inwards. The cutouts leave in the axial portion 26 a continuous annular portion distant from the radial portion 27, and a portion in which the tabs 28 are formed. The fixing ring 18 and the operating element 16 may have substantially identical inside diameters.

The tabs 28 project into the annular groove 16c with their free ends 28a coming into contact butting against the radial surface of the annular groove 16c on the opposite side to the shoulder 16b. The additional ring 19 and the operating element 16 may have substantially identical outside diameters so as to avoid the roughnesses that might detract from ease of mounting. The additional ring 19 and the operating element 16 may be fixed together by a simple axial movement. The free ends 28a of the tabs 28 are capable of outwards effacement before they enter the annular groove 16c, at least partially readopting their original position they had in the unstressed state, thus securing the additional ring 19 and the operating element 16 in a reliable way.

Mounting may be done as follows. An axial movement is used to bring the operating element 16 into the additional ring 19, the axial portion 26 surrounding the smaller-diameter free end of the operating element 16. The tabs 28 undergo outwards effacement in order to pass over the rim of the groove 16c, then turn elastically inwards into the groove 16c, clipping thereinto.

An axial movement is then used to bring the non-rotating race 1 into position, the radial portion 5 coming into contact with the radial portion 27 of the additional ring 19. The axial portion 26 then finds itself substantially in the axial region of the rolling elements 3.

An axial movement is then used to bring the fixing ring 18 into position on the opposite side of the radial portion 5 of the non-rotating race 1. The axial portion 20 moves into the bore of the radial portion 5 of the non-rotating race 1, into the free end of the radial portion 27 of the additional ring 19 and into the large-diameter portion 16e of the operating element 16. The tabs 23 undergo inwards effacement, passing over the free end of the radial portion 27 of the additional ring 19. The elastic portion 21 comes into contact with the radial portion 5 of the non-rotating race 1.

An axial force may be exerted in order elastically to deform the elastic portion 21 in order to continue the axial movement. Through elasticity the tabs 23 then diverge outwards in contact with the bore of the large-diameter portion 16e of the operating element 16 once the free ends 24 of the tabs 23 have crossed the free end of the radial portion 27. The free ends 24 of the tabs 23 then come into butting contact with the radial portion 27 thus inhibiting separation of the fixing ring 18 from the subassembly formed by the additional ring 19, the non-rotating race 1, and the operating element 16. The non-rotating race 1 is held axially with slight preload between, on the one side, the elastic portion 21 and, on the other side, the radial portion of the additional ring 19, maintaining radial clearance by virtue of the difference in diameter between the axial portion 20 of the fixing ring 18 and the bore of the radial portion 5.

As an alternative, provision may be made for the operating element 16 to be brought in last onto a subassembly including the non-rotating race 1, the fixing ring 18 and the additional ring 19.

It will be understood that this type of mounting is particularly simple, using a first axial movement to arrange the additional ring 19 on the operating element 16 and a second axial movement to position the fixing ring 18. This dispenses with any step of bending a rim during the assembly of these elements.

In the embodiment illustrated in FIG. 4, there is also provided a sealing member 29, of annular shape, including a first axial portion 29a arranged in contact with the bore of the radial portion 5 of the non-rotating race 1. The first axial portion 29a may be pushed or simply centred into the bore. The sealing member 29 is supplemented by a radial portion 29b in contact, on the one side, with the radial portion 5 and, on the other side, with the outer edge of the elastic portion 21 of the fixing ring 18 and a second axial portion 29c facing away from the radial portion 5 and forming a narrow passage with the free end of the radial portion 7 of the rotating race 6 to improve the sealing of the rolling bearing. The fixing ring 18 may contact an element mounted on the non-rotating race 1, this element providing sealing between the rotating and non-rotating races.

In the embodiment illustrated in FIG. 5, the additional ring is omitted. The radial portion 5 of the non-rotating race 1 is in direct contact with the radial end surface of the operating element 16. The operating element 16 is provided with an annular rib 16h projecting inwards, adjacent to the radial end surface, and limiting the large-diameter portion 16e. The rib 16h serves for the abutment of the free ends 24 of the tabs 23. A sealing member 29 is provided. However, it would be possible to envisage a device according to FIG. 5 but with no sealing member 29, like that of FIG. 1. The exterior surface 16a of the operating element 16 is cylindrical.

A system for fixing the thrust rolling bearing and for achieving self-centering may be very compact and easy to assemble, even automatically. Simple axial movements are enough for mounting which is therefore economical and reliable. The operating element is of simple shape and therefore robust.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A clutch release bearing device comprising:
    an operating element;
    a rolling bearing equipped with a non-rotating race and a rotating race, wherein the rolling bearing is secured axially to the operating element; and
    an annular fixing ring made in one piece, wherein the fixing ring comprises:
        an axial annular portion mounted in the operating element;
        an axially annular elastic portion bearing axially against the non-rotating race on the axially opposite side of the operating element; and
        fixing tabs;
        wherein the fixing ring is able to hold the non-rotating race axially secured to the operating element while at the same time allowing radial movement.

2. The device of claim 1, wherein the fixing ring is in direct contact with the operating element.

3. The device of claim 1, wherein the operating element comprises a bore, and wherein the axial portion of the fixing ring is mounted in that bore.

4. The device of claim 1, wherein the elastic portion is substantially radial and inclined towards the radial portion of the non-rotating race.

5. The device of claim 1, wherein the elastic portion has a convex surface on the same side as the non-rotating race.

6. The device of claim 1, wherein a plurality of holes are formed in the elastic portion.

7. The device of claim 1, wherein a free end of the fixing tabs is in contact with a surface secured to the operating element.

8. The device of claim 7, wherein the free end of the fixing tabs is in contact with a substantially radial surface of the operating element.

9. The device of claim 1, further comprising an additional fixing ring secured to the operating element.

10. The device of claim 9, wherein the additional fixing ring comprises an axial portion and a radial portion in contact with the operating element.

11. The device of claim 10, wherein the radial portion of the additional fixing ring is in contact with the non-rotating race.

12. The device of claim 10, wherein the additional fixing ring comprises fixing tabs for fixing to the operating element, and wherein the tabs originate from the axial portion.

13. The device of claim 10, wherein the axial portion of the additional fixing ring surrounds a part of the operating element.

14. The device of claim 9, wherein the additional fixing ring comprises a retaining surface for retaining the fixing ring.

15. The device of claim 1, wherein the non-rotating race comprises an inwardly facing radial portion arranged axially between the elastic portion of the fixing ring and a surface secured to the operating element.

16. The device of claim 1, wherein the non-rotating race is in direct contact with the elastic portion of the fixing ring.

17. The device of claim 1, further comprising a sealing element secured to the non-rotating race and in contact with the elastic portion of the fixing ring.

18. The device of claim 1, wherein the operating element is a hydraulic pusher.

19. A clutch control system comprising:
    a clutch release bearing device comprising:
        an operating element;
        a rolling bearing equipped with a non-rotating race and a rotating race, wherein the rolling bearing is secured axially to the operating element; and
        an annular fixing ring made in one piece, wherein the fixing ring comprises:
            an axial annular portion mounted in the operating element;
            an axially annular elastic portion bearing axially against the non-rotating race on the axially opposite side to the operating element; and
            fixing tabs;
            wherein the fixing ring is able to hold the non-rotating race axially secured to the operating element while at the same time allowing radial movement.

* * * * *